May 26, 1942. H. W. KLAGES 2,284,215
EXCAVATOR
Filed Sept. 9, 1940 3 Sheets-Sheet 2
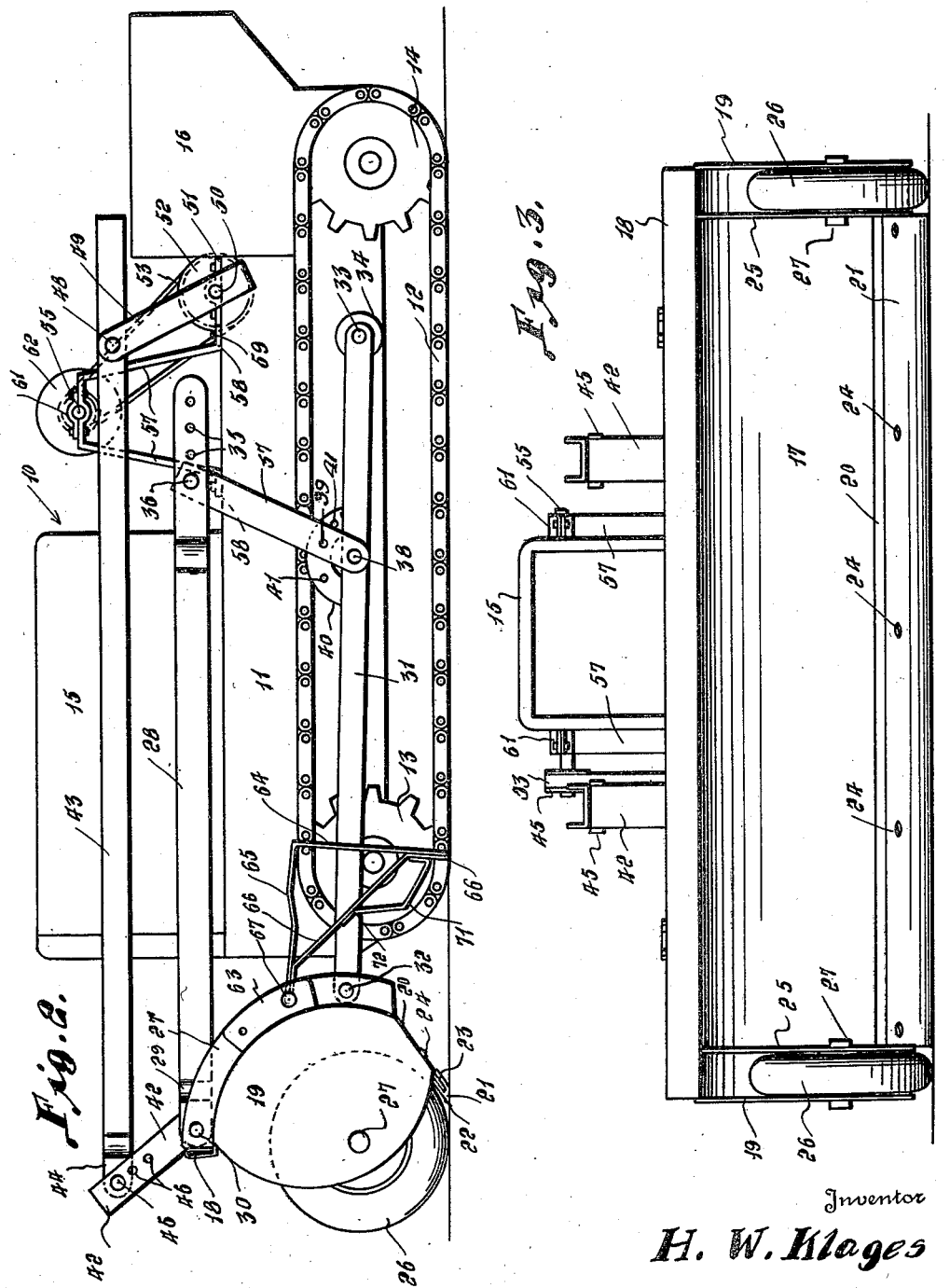
Inventor
H. W. Klages
By J. K. Bryant
Attorney May 26, 1942. H. W. KLAGES 2,284,215
EXCAVATOR
Filed Sept. 9, 1940 3 Sheets-Sheet 3
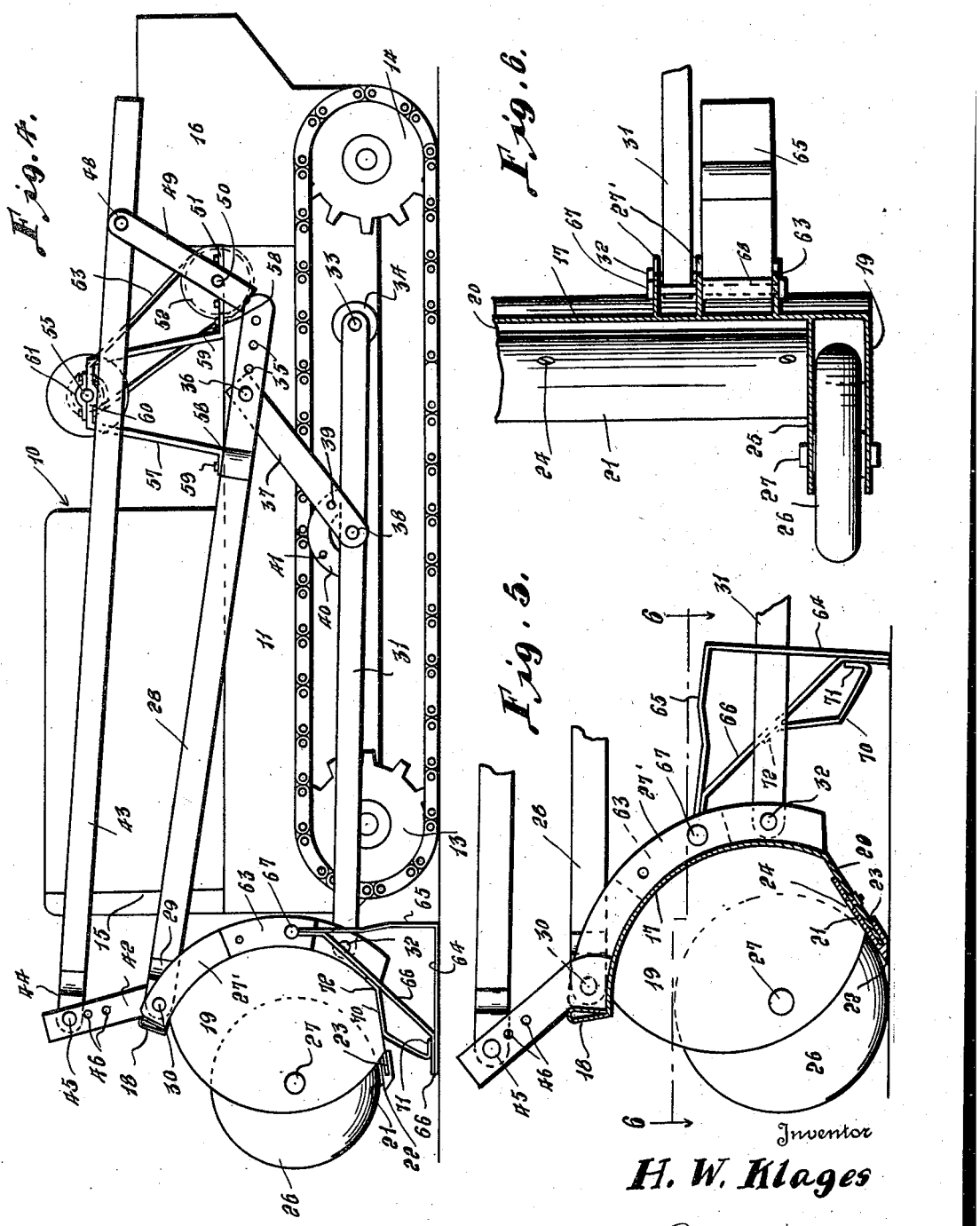
Inventor
H. W. Klages
By J. K. Bryant
Attorney Patented May 26, 1942

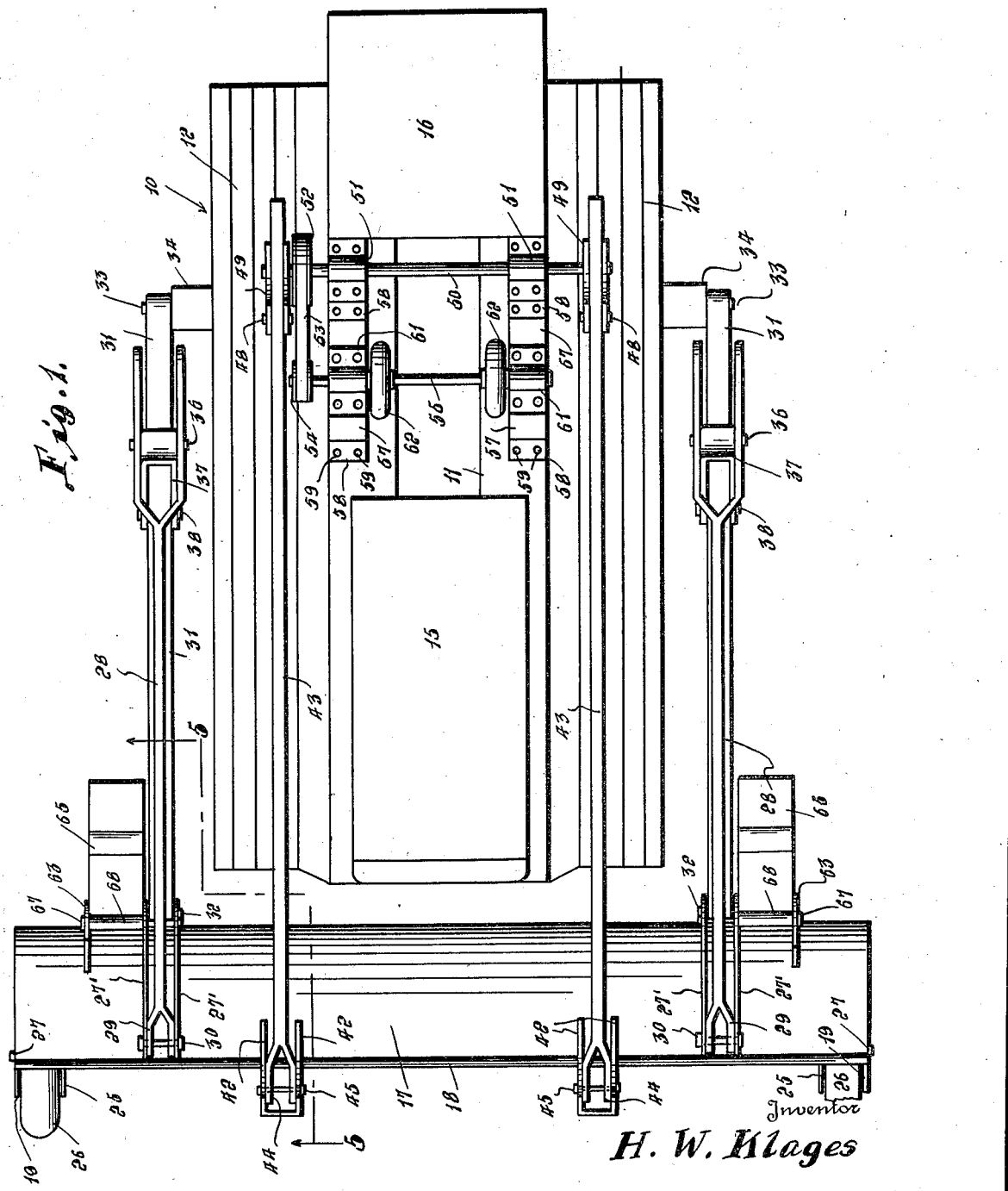

2,284,215

UNITED STATES PATENT OFFICE 2,284,215

EXCAVATOR

Henry W. Klages, Echo, Oreg.

Application September 9, 1940, Serial No. 356,057

3 Claims. (Cl. 37—144)

The present invention relates to improvements in excavators.

The primary object of the invention is to provide an excavator in the form of a scoop or grader, including a scraper carried forwardly of a tractor or other prime mover which will be raised from the ground upon which the scraper is operating when the prime mover is moved in a reverse direction.

A further object of the invention is to provide a land excavator such as a scraper, scoop or the like with shoes at the ends thereof or adjacent portions so that a reverse movement of the land scraper or leveler will be raised from the surface of the ground when being moved rearwardly.

A still further object of the invention is to provide link connections between a scraper and prime mover which are adapted to regulate the scoop or scraper with respect to the surface of the ground and which linkage may be controlled from the driver's seat of the tractor or prime mover.

A still further object of the invention is to provide a land excavator including a blade carried forwardly of a tractor or prime mover, which blade may be moved to a scooping position or a scraping position.

Other objects and advantages of the invention will become apparent during the course of the following description of the accompanying drawings, wherein, Figure 1 is a detail plan view illustrating the invention applied to a conventional tractor or prime mover;

Figure 2 is a detail side elevational view showing the arrangement of the linkage between the tractor and excavating blade;

Figure 3 is a front elevational view illustrating in detail the structural elements of the land scraper;

Figure 4 is a side elevational view illustrating in detail the manner in which the land scraper is raised from the surface of the land when the tractor is moved rearwardly;

Figure 5 is a longitudinal cross-sectional view taken on line 5—5 of Figure 1, looking in the direction of the arrows, illustrating the structural details of the scraper blade and the elevating shoes; and Figure 6 is a horizontal cross-sectional view taken on line 6—6 of Figure 5, looking in the direction of the arrows, showing the connection between the tractor connection linkage and the scraper and also illustrating the pivotal connection for the elevating feet.

In the drawings, wherein for the purpose of illustrating the invention like reference characters will be employed to designate like parts throughout the same, the reference character 10 will generally be employed to designate a tractor including a frame structure 11 supported by traction belts 12 passing over toothed rollers 13 and 14 mounted forwardly and rearwardly of the tractor frame 11. A motor 15 is provided on the tractor frame for propelling the tractor and a seat portion 16 is provided at the rear of the tractor.

The above structure is typical of present-day tractors generally used for propelling and drawing frame implements.

The invention comprises a transverse scraper blade 17 mounted forwardly of the tractor 10 and said blade is provided with a beaded upper edge 18 and is closed at the ends by walls 19. The lower edge of the arcuately curved blade 17 terminates in a relatively straight portion 20 to which is removably secured a sharpened blade element 21 having a pointed end 22 providing a knife-like edge. The cutter blade 21 is provided with a longitudinal slot 23 which completely encloses and receives the lower edge of the relatively straight scoop portion 20. Bolts 24 are provided at spaced intervals for locking the cutter blade 21 against displacement from the scraper portion 20.

Spaced inwardly from the end walls 19 are similarly shaped walls 25, between which may be positioned supporting wheels 26 held in place by stub axles 27 extending through the end walls 19 and spaced partition walls 25.

Mounted on the rear arcuately curved surface of the scraper blade 17 adjacent each end thereof are opposed flanges 27' which extend from the beaded edge 18 to the relatively straight terminating portion 20 of the scraper. Mounted between the upper portions of the arcuately curved flanges 27' is a supporting bar 28 having the forward end bifurcated as at 29 so that the furcations will engage the inner walls of the arcuately curved flanges 27' so that a bolt 30 may extend therethrough and pivotally anchor the supporting bar 28.

Pivotally attached to the lower portion of the scraper 17 and between the lower ends of the arcuately curved flanges 27' is a supporting bar 31 held in place by a bolt or the like 32 extending through the arcuately curved flanges. The supporting bars 31 extend in parallel relation on opposite sides of the tractor frame 11 and have their rear ends connected thereto as at 33. Spacing blocks 34 are interposed between the tractor frame 11 and the side supporting bars 31 to outwardly space said bars therefrom.

The rear end of each of the supporting bars 28 is provided with a series of apertures 35 for alternately receiving a pivot pin 36 carried by the upper end of a link 37. The lower end of the link 37 is pivotally attached to the side supporting bar 31 as at 38 and is provided with an aperture 39 which is adapted to register with spaced apertures 41 formed in a segment shaped plate 40 carried on the upper side of the side supporting bar 31.

When the link 37 is in its position shown in Figure 4, the scraper blade 17 will be rotated about the pivot point 32 so that the scraper blade may perform a scooping operation. When the link 37 is extended forwardly so that the aperture 39 aligns with the forward aperture 41 whereby a bolt or the like may be extended therethrough, the scraper blade 17 will be in position to perform a scraping operation.

Secured to the upper portion of the scraper blade 17 in spaced relation is a pair of angle bars 42, the lower ends of which are secured in place by welding or other fastening means adjacent the upper beaded portion of the scraper blade.

Pivotally mounted between each of the channel bars 42 are adjusting bars 43, the forward portions of which are bifurcated as at 44 for receiving a pivot pin 45. Alternate apertures 46 are provided in the channel bars 42 whereby the front ends of the adjusting bars 43 may be moved toward or away from the end of the channel bars 42.

The rear ends of the adjusting bars 43 are provided with pivot pins 48 to which is pivotally attached the upper end of a crank arm 49 rigidly secured to an operating shaft 50 rotatably carried by the tractor frame 11 and held in place by suitable journal bearings 51. Rigidly secured to the rotary shaft 50 is a pulley 52 over which is trained an endless belt 53 which also encircles a pulley 54 mounted on one end of an operating shaft 55.

Supporting brackets 57 are provided with foot portions 58 which are anchored to the tractor frame 11 by bolts or the like 59, while the upper portion of the brackets 57 are provided with bearing supporting surfaces 60 having bearing caps 61 for rotatably supporting the control shaft 55. Hand wheels 62 are provided on the control shaft 55 so that the operator may grasp the hand wheels with his right or left hand and impart rotation to the shaft 55 whereby the operating rotary shaft 50 will cause the crank arm 49 to swing in an arc to move the adjusting bars 43 either forwardly or rearwardly and thereby change the position of the scraper blade 17 to the extreme location illustrated in Figures 2 and 4.

Mounted outwardly towards the ends of the scraper blade and adjacent each outer flange 27' is an arcuately curved plate 63 between which is pivotally mounted a lifting foot formed of a piece of strap iron having a base portion 64 and an angle portion 65 connected by an angular portion 66. The free end of the base portion 64 as at 66 provides a ground engaging portion as shown clearly in Fig. 2. The strap iron foot is pivotally mounted between the outer arcu-ately curved flange 27' and the arcuately curved plate 63 by means of a bolt 67 extending through a bearing portion 68 formed at the ends of the angular portions 65 and 66. Each strap iron foot member is braced by an angle brace bar 70 having one end return bent as at 71 so that it may be welded in place upon the foot portion of the angle strap 66. The opposite end is welded in place as at 72 upon the intermediate portion of the angle strap 66.

In operation, the tractor 10 may be propelled forwardly with the hand controls operated to shift the crank arm 49 forwardly so that the knife edge 22 will engage the ground surface and produce a scraping action. When the tractor and scraper have collected a large amount of earth, the motion of the tractor is reversed so that the feet 65 will engage the ground and raise the scraper upwardly as shown in Figure 4.

When it is desired to use the scraper as a scoop, the crank arm 49 may be shifted to the position shown in Figure 4 whereby the cutting edge 22 will engage the ground and the wheel 26 will be raised off of the ground. In this manner, the scraper may be propelled forwardly by means of the tractor 10 until the arcuately curved blade 17 is loaded with earth, at which time the tractor may be reversed in its travel so as to cause the dumping of the scraper blade by the pivoted feet 65 engaging the ground and raising the scraper vertically as shown in Figure 4.

During normal forward travel of the scraper blade 17, the raising and dumping feet 55 assume the position shown in Figs. 2 and 5, wherein they trail behind the scraper blade with the edge 66 dragging on the surface of the ground. Upon reversal of the tractor 10, the edge 66 digs into the ground and remains stationary while the continued rearward travel of the tractor causes the scraper 17 to be raised above the surface of the ground and in spaced relation thereto.

It is to be understood that the form of the invention herewith shown and described is to be taken as the preferred embodiment of the invention and that various changes in the shape, size and arrangement of parts may be resorted to without departing from the spirit and scope of the invention as claimed.

I claim:

1. A land scraping machine comprising a tractor, a pair of side bars having their rear ends pivoted to the tractor and extending parallel on each side thereof, a scraper blade pivotally attached to the forward ends of the side bars, adjusting bars carried by the upper portion of the scraper blade adapted to extend rearwardly therefrom, manual means carried by the tractor for moving the adjusting bars forwardly or rearwardly, supporting wheels carried by the ends of the scraper blade and foot members secured to the rear of the scraper blade adapted to engage the ground whereby reverse movement of the tractor will elevate the scraper blade in spaced relation from the ground surface.

2. A land scraping machine comprising a tractor, parallel side bars pivoted to the tractor and extending forwardly thereof, a scraper blade pivotally attached at its lower end to the parallel side bars, adjusting bars pivotally attached to the upper portion of the scraper blade, means carried by the tractor for manually controlling the adjusting bars, ground wheels movable with the scraper blade and adapted for ground engagement when the scraper blade is in ground scraping position, and ground engaging foot members secured to the rear of the scraper blade adjacent each end thereof for engaging the ground upon rearward movement of the tractor to elevate the scraper blade in spaced relation from the ground surface.

3. A land scraping machine comprising a tractor, a pair of parallel side bars pivotally attached to the tractor and extending forwardly therefrom, an arcuately curved scraper blade pivotally attached to the forward ends of the parallel side bars, supporting wheels at each end of the scraper blade operative for ground engagement when the scraper blade is in ground scraping position, and ground engaging foot members carried adjacent the ends of the scraper blade within the confines of the supporting wheels whereby said foot members may raise the scraper blade upon reverse movement of the tractor.

HENRY W. KLAGES.